(No Model.)
J. B. McCUNE.
PNEUMATIC TIRE.
No. 456,771.              Patented July 28, 1891.
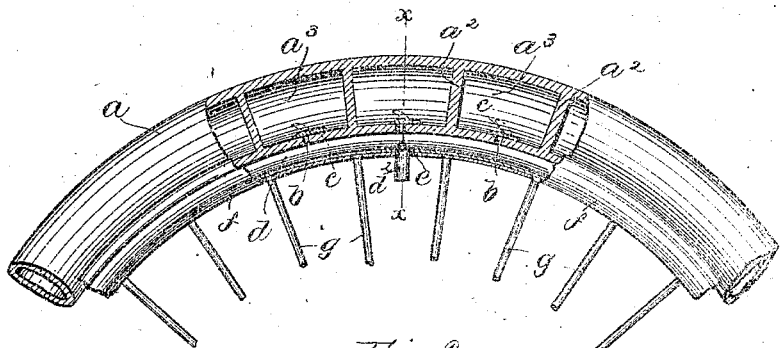
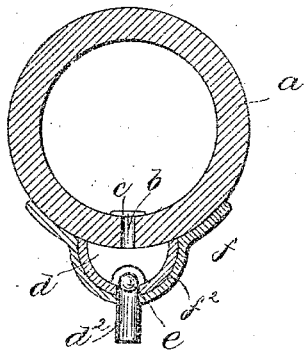
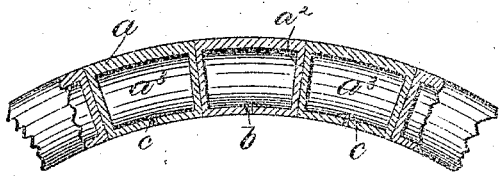
Witnesses
Jas. J. Maloney
M. E. Hill
Inventor,
Joseph B. McCune.
By Jos. P. Livermore
Atty.

UNITED STATES PATENT OFFICE.

JOSEPH B. McCUNE, OF EVERETT, MASSACHUSETTS.

PNEUMATIC TIRE.

SPECIFICATION forming part of Letters Patent No. 456,771, dated July 28, 1891.

Application filed May 4, 1891. Serial No. 391,516. (No model.)

*To all whom it may concern:*

Be it known that I, JOSEPH B. McCUNE, of Everett, county of Middlesex, State of Massachusetts, have invented an Improvement in Pneumatic Tires for Vehicles, of which the following description, in connection with the accompanying drawings, is a specification, like letters on the drawings representing like parts.

My invention relates to a pneumatic or hollow inflatable tire for wheels of vehicles. Tires have been made for bicycles and other vehicles consisting of a hollow flexible tube supported in the felly of the wheel and inflated with air under considerable pressure, so as to afford a highly-elastic support for the wheel, and means are commonly provided for forcing air into the said tubular tire from time to time in order to maintain the same in the proper state of tension. Such tires are open to the objection that if punctured so that the air escapes they collapse and the vehicle becomes substantially unridable, or if an attempt is made to use the vehicle with the tire in collapsed condition the latter becomes damaged, so as to make repairs very difficult and expensive.

The present invention is embodied in a tire composed of a flexible tube having numerous transverse air-tight partitions by which it is divided into separate compartments, each of which is provided with a suitable controlled inlet-passage, through which it may be inflated to give the proper air-pressure and consequent elasticity, combined with an inflating-chamber, as hereinafter described, communicating with the said several compartments, whereby all said compartments may be inflated simultaneously and substantially uniformly by forcing air into the said inflating-chamber. Such construction has many advantages over the usual tubular pneumatic tire, the most important of which is that if the tire should be punctured at any point it will only permit the escape of air from the compartment in which the puncture is made, the rest of the tire being left in working condition, so that the vehicle may be used without serious detriment until the punctured compartment can be repaired. The tire has greater elasticity for a given interval, owing to the fact that when a portion of the tire is flattened or compressed by contact with the ground the air contained in a few of the compartments nearest the ground resists substantially the whole of the compression, and a much less reduction of volume of the air in said compartments is required to make its pressure sufficient to sustain the weight on the wheel than is the case when the volume of air in the whole tire is compressed by the distortion or flattening of the wire at one point, as is usually the case. For this reason an equally elastic tire can be produced with much less pressure of the confined air, so that there is less tendency to leakage or rupture than is the case when the entire volume of air is depended upon to hold the part of the tire in contact with the ground distended to resist the weight supported on the wheel.

In order to provide convenient means for inflating the several compartments of the tire uniformly, an inflating-chamber is provided extending wholly around the tire and communicating with the inlet-passages to all the compartments, said inflating-chamber being provided with any convenient means to receive an air-forcing apparatus by which air is compressed into it, so as to pass by its pressure into the several compartments, the inlet-passages of which are provided with check-valves or equivalent devices by which the air is permitted to enter the compartments when the pressure is greater in the inflating-chamber than in the compartment, but is prevented from again passing out of the compartment, except as it may escape through such slow gradual leakage as may take place when air under substantial pressure is confined in this manner.

Figure 1 is a side elevation, partly in longitudinal section, of a portion of a wheel-rim provided with a pneumatic tire embodying this invention. Fig. 2, a transverse section thereof on line $x\ x$ on a larger scale, and Fig. 3 a longitudinal section showing a modified construction of the tire.

The tire $a$ consists of a tube, preferably circular in cross-section and composed of yielding or flexible air-tight material, such as commonly employed for tires of this kind, the interior or bore of said tube being provided from point to point with air-tight partitions $a^2$, thus forming a series of independent air-tight chambers or compartments $a^3$. The said partitions should be close enough together along the tire to divide the same into comparatively short compartments, so that in case one compartment should be disabled or fail to contain air under sufficient pressure to keep it distended the two adjoining compartments will afford a substantial support for the wheel when the disabled compartment is in most direct contact with the ground. Each compartment is provided with an inlet-passage $b$, so constructed as to permit a free inflow of air to the compartment and to prevent outflow, it being shown as provided with a flap-valve $c$, placed at the inside of the compartment, so that it yields to permit air to enter the compartment, but is closed tightly over the inlet-passage $b$ by the air tending to leave the compartment through the said passage. Each compartment may thus be inflated or filled with air under the desired pressure, and will retain said air under pressure without reference to the condition of pressure in the remaining compartments.

In order to afford convenient means for inflating all the compartments simultaneously and uniformly, an inflating-chamber $c$ is provided, which extends along the entire length of the tire $a$ and communicates with all the inlet-passages $b$ to the several compartments. The said inflating-chamber is provided with an inlet-passage $d$, which may have a check-valve $e$, of any suitable construction, said passage $d$ being adapted to receive the discharge-pipe of any suitable or usual air-compressing device by which air may be forced into the said inflating-chamber $c$, so that as soon as the pressure in the said inflating-chamber becomes greater than that in any compartment $a^3$ it passes through the inlet-passage $b$ into said compartment, bringing the pressure therein up to that in the inflating-chamber $c$. As shown in this instance, the tire $a$ is fastened in any suitable manner in the felly or wheel rim $f$, which has a longitudinal recess $f^2$ to contain the inflating-chamber $c$, which practically constitutes merely an air-tight lining for the said depression or recess $f^2$. The said wheel-rim $f$ $f^2$ may be connected with the spokes $g$ of the wheel in any suitable manner. After the air-compressing instrument is removed from the inlet-passage $d$ to the inflating-chamber $c$ the valve $b$ will close, maintaining the pressure in said chamber $c$, which will contribute to the support of the tire $a$ in the rim $f$; but there should be sufficient bearing of the tire in the rim $f$ outside of the inflating-chamber $c$ to afford a working support for the said tire. By this construction, if the wall of the tire should become punctured in any one of the compartments, the air will be permitted to escape from the said compartment, and will also escape from the inflating-chamber by passing through the inlet-passage of the punctured compartment; but the remaining compartments will retain the air under pressure and will afford a sufficient support to enable the wheel to be used without damage until the punctured compartment can be repaired.

Instead of making the tire of a single continuous piece of tubing provided with partitions, it may be made up of short sections of tube closed at each end, as shown in Fig. 3, so that when the said sections are cemented in place in the wheel-rim, and preferably also cemented together end to end, a tire will be formed substantially the same as the one shown in Fig. 1 and operating as has been described. When the tire is subjected to compression, as by contact with the ground, the compartments that happen to come upon the ground will be flattened, compressing the air therein until its pressure is sufficient to prevent further flattening of the tire, and such pressure will bulge out the partitions at each end of the compartment, thus compressing the air in the adjacent compartments, but to a less extent, and the compression in them in turn will cause a still less compression in the next compartment, so that the wheel is supported mainly by the pressure of the air in a few compartments nearest the ground, and requires much less initial pressure to give sufficient support than is the case when the flattening of the tire at one point is resisted only by the pressure of the air in the entire length of the tire. The herein-described tire is thus more efficient and durable than those that have been heretofore used, even while the walls remain unpunctured, and it has the further advantage that it may be punctured at one or more points without materially impairing its usefulness.

I claim—

The combination, with a flexible tire composed of separate hollow compartments, each provided with an inlet-passage, of an inflating-chamber extending along the tire and communicating with the inlet-passages to all the said compartments, substantially as and for the purpose described.

In testimony whereof I have signed my name to this specification in the presence of two subscribing witnesses.

JOSEPH B. McCUNE.

Witnesses:
 JOS. P. LIVERMORE,
 M. E. HILL.